July 13, 1965  J. H. FIELD  3,195,095
COMBINATION GAS-ELECTRIC COUPLING
Filed Aug. 23, 1962  3 Sheets-Sheet 1

INVENTOR.
JAMES H. FIELD
BY
ATTORNEYS

July 13, 1965

J. H. FIELD 3,195,095

COMBINATION GAS-ELECTRIC COUPLING

Filed Aug. 23, 1962

INVENTOR.
JAMES H. FIELD
BY
Patterson, Wright & Patterson
ATTORNEYS

July 13, 1965    J. H. FIELD    3,195,095
COMBINATION GAS-ELECTRIC COUPLING
Filed Aug. 23, 1962    3 Sheets-Sheet 3
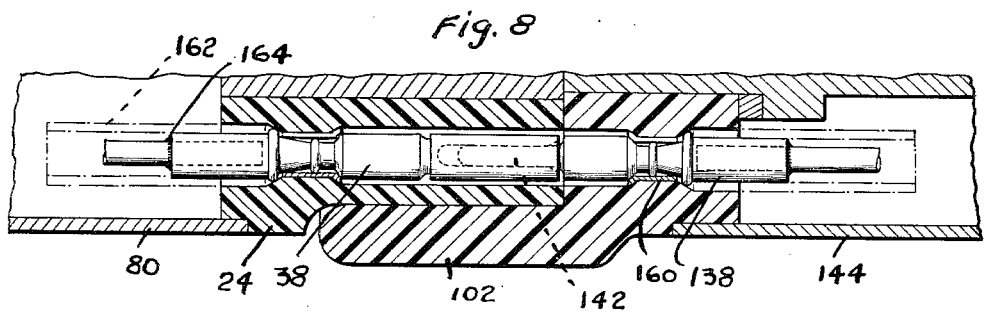
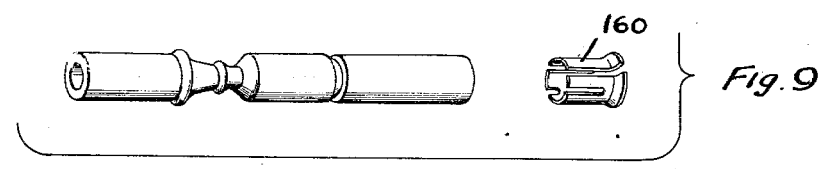
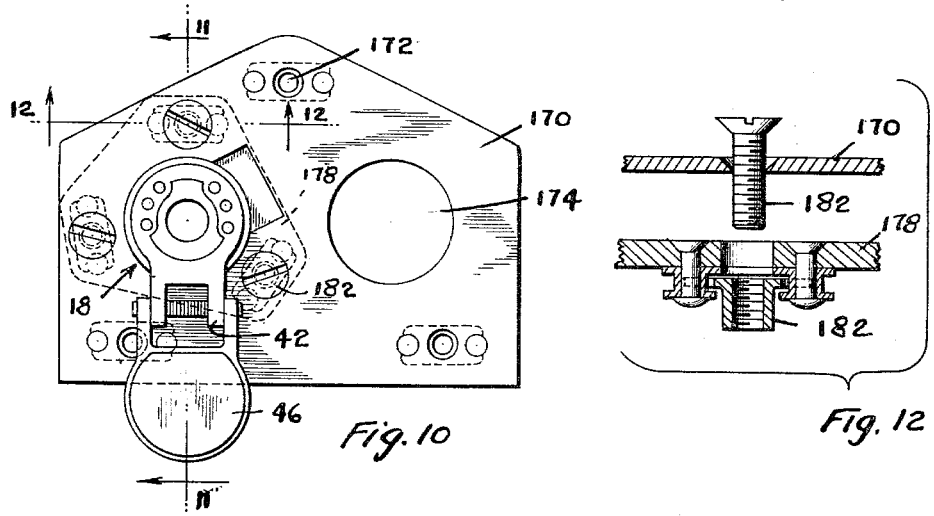
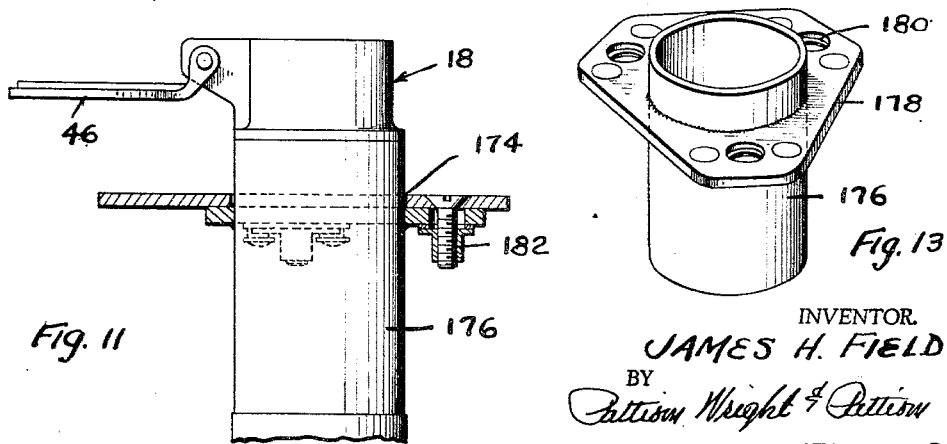
INVENTOR.
JAMES H. FIELD
BY
ATTORNEYS

United States Patent Office 3,195,095
Patented July 13, 1965

3,195,095
COMBINATION GAS-ELECTRIC COUPLING
James H. Field, Potomac, Md., assignor to R. E. Darling
Co., Inc., a corporation of Maryland
Filed Aug. 23, 1962, Ser. No. 219,017
6 Claims. (Cl. 339—16)

The present invention relates to a quick disconnect fitting for a flexible hose, and more particularly and specifically to a quick disconnect coupling for interconnecting gas and electrical conducting components in separable sections of a flexible tube or hose.

It has been a practice for a period of years to provide flight personnel with equipment including flexible conduits for conducting oxygen from a source of supply to personnel face masks, helmets, or the like. It has also been found desirable and necessary to provide flight personnel with gear with electrical leads or connections for communication, heat and instrumentation purposes.

Initial developments in the prior art evidence the utilization of flexible rubber tubing to deliver oxygen to flight personnel and the provision of encased electrical leads running parallel with and secured externally to the tubing with separate couplings between tubing sections and their associated electrical leads.

Subsequent developments in the art disclose the construction of flexible rubber or elastomeric compound tubing as an oxygen hose in which electrical leads are built integrally into the wall structure of the hose with such leads being withdrawn through the side wall of the hose adjacent the ends thereof where they are provided, externally of the hose, with connector fittings adapted to mate with cooperative fittings on another section of hose to which they are to be coupled. An example of such a prior art construction is clearly disclosed in U.S. Letters Patent No. 2,602,608, issued July 8, 1952 to Ralph E. Darling.

Still later developments in the art disclose improvements in couplings for oxygen hoses wherein the electrical connections and the gas connections are formed side by side in a single body so that they may be interconnected with a single action of connection between separable hose sections. An example of such an improved coupling construction is fully disclosed in U.S. Letters Patent No. 2,634,311, issued April 7, 1953 to Ralph E. Darling.

Most recent developments and refinements in the art have resulted in the provision of male and female coupling members for flexible oxygen hoses in which the gas conduits are interconnected coaxially of the two coupling elements and the electrical connections are made through the medium of diminutive conductive pins arranged concentrically about the gas conduit of the male coupling element and a plurality of pin receptacles or sockets arranged concentrically about the gas conduit of the female coupling in aligned registry with the pins of the male element. This construction provides for a simple plugging or unplugging action between the two coupling elements which serves to connect or disconnect the gas conduits and the electrical leads between the separable elements simultaneously within a single, compact fitting.

It has been discovered in the use of the coupling elements in current day use that repeated connection and disconnection of the coupling elements may result in the loosening, bending and even breaking of the connector pins, and the loosening and scoring of the pin receptacle sockets, impairing their effectiveness, if not destroying entirely their usefulness. When such impairment or destruction occurs it has been necessary to discard the entire hose assembly since the coupling elements are formed as integral parts of the hoses to insure gastightness, and hence substantial losses have attended the damage occurring to the pin and socket elements of the couplings.

It is, therefore, a general object of the present invention to provide male and female coupling elements for use in connection between separable sections of oxygen breathing hose which can be made integrally gastight with their respective hose sections in conformity with present day construction, and in which the electrical pins and socket receptacles of both the male and female coupling elements may be readily removed and replaced without damage to the hose or to the gastight construction of the hose and coupling assembly.

A principal object of the present invention resides in the provision of mating male and female coupling components for connecting the gas and electrical communication elements of separable flexible hose sections in which the pin and socket assemblies may be readily removed and replaced for repair purposes.

Another and important object of this invention rests in providing male and female coupling components for interconnection of separable oxygen hose sections in which the couplings are adaptable to use in the manufacture of flexible oxygen hose under present day procedures and to present day standards to provide gastight connection and positive electrical connection between the separable hose sections when coupled.

Still another object of this invention rests in the provision of a coupling composed of male and female elements for providing electrical and gas interconnection which readily permits the removal and replacement of one or all of the electrical connector elements, male and female, and which permits the quick connection of electric leads to established terminals within the coupling, and the ready and quick reassembly of the unit without any impairment of the established integral gastight connection between the coupling section and the hose section with which it is integrally formed.

The nature of the present invention may be stated in general terms as relating to a combination gas-electric disconnect fitting including male and female coupling components, each coupling component having a central gas conduit and means for securing said conduit in extension of the central bore of a flexible hose; the male coupling component including a projecting hollow stem axially thereof communicating with the central gas conduit thereof, and plural conductive pins projecting therefrom in concentric arrangement about said stem, said pins being removably mounted in said component and each having electrical connection with a lead formed integrally in the flexible hose; the female coupling component including an axial receptacle for receiving the projecting hollow stem of the male coupling, said receptacle having communication with the central gas conduit of the female component, and plural conductive sockets mounted therein in concentric arrangement about said central receptacle and radially arranged to register with the conductive pins of said male coupling component, said sockets being removably mounted in said female coupling component and each having electrical connection with a lead formed integrally with the flexible hose.

Referring now to the accompanying drawings in which like numerals designate similar parts throughout the several views:

FIG. 5 is a vertical section taken on line 5—5, FIG. 4a;

FIG. 6 is a vertical section taken on offset line 6—6, FIG. 4a;

FIG. 8 is an enlarged fragmentary section illustrating a conductive pin and socket engaged;

FIG. 9 is an exploded view of the pin and socket and retaining element of FIG. 8;

FIG. 10 is a top plan view of the female component mounted in a console;

FIG. 11 is a vertical section taken on line 11—11, FIG. 10, with the female coupling shown in full line;

FIG. 12 is a vertical section taken on line 12—12, FIG. 10;

FIG. 13 is a perspective view of the console mounting fitting for the female coupling component.

The embodiments of the present invention disclosed in the accompanying drawings are of a character which have been discovered to be particularly adaptable for use in connection with a smooth bore, flexible oxygen breathing hose formed of a rubber or silicone rubber compound and in which a plurality of electrical leads are formed integrally in the wall of the house to extend through the hose length and project from the side wall thereof adjacent the ends thereof to permit their attachment to electrical leads or terminals within coupling fittings.

Figure 1:
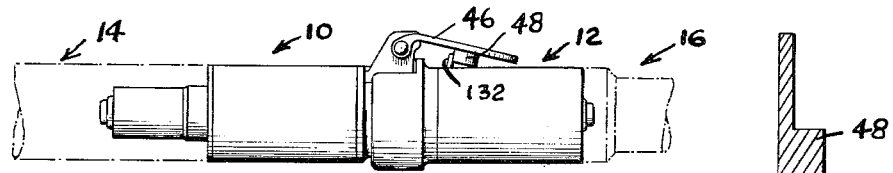
FIG. 1 is a side elevation of the male and female coupling components in coupled arrangement.

As is illustrated in FIG. 1 of the drawings, the coupling constituting the present invention consists generally of a female coupling component 10 and a male coupling component 12, each secured to the end of a length of flexible oxygen hose, 14 and 16 respectively. The engagement of the male and female components of the coupling serves to provide or establish between the separate hose sections 14 and 16 a continuity of the gas conduits and of the electrical leads forming integral parts of the separate hose sections.

Figure 4A:
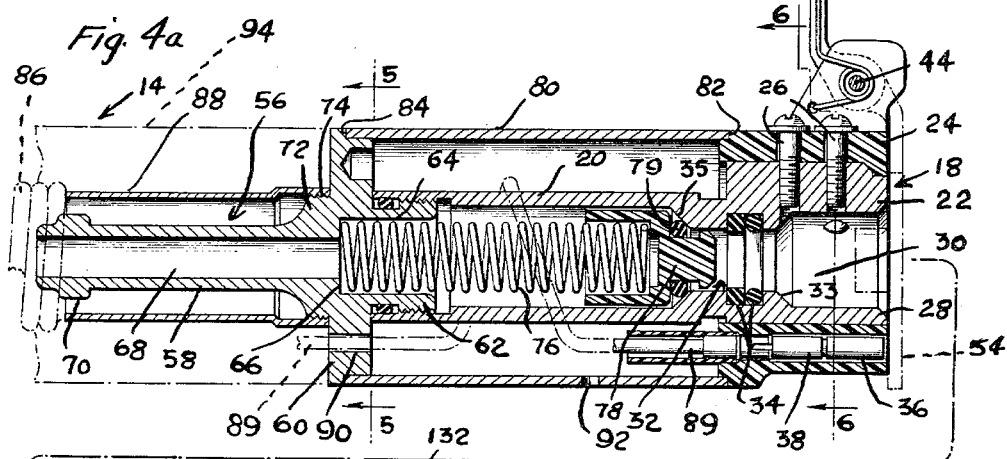
FIG. 4a is a sectional view taken on line 4a—4a, FIG. 2.
Figure 2:
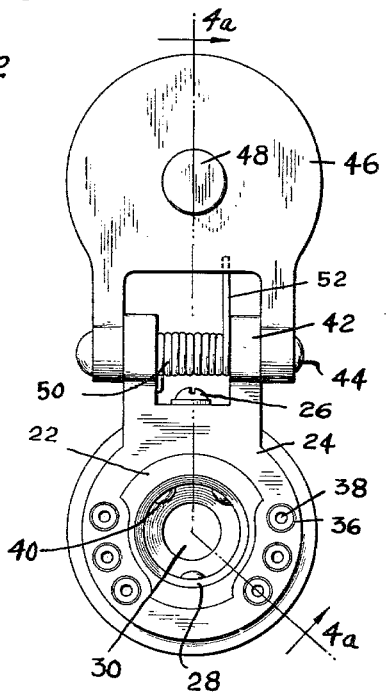
FIG. 2 is an end view of the femal coupling component.

As is best illustrated in FIGS. 2 and 4a, the female coupling component consists of a short cylindrical body element 18 which is provided on one face thereof with in integral, projecting tubular extension 20. The body element 18 is formed in two sections, namely, a central section 22 with which the tubular extension is integrally formed, and a circumferential ring section 24 of non-conductive material formed concentrically about the short cylindrical body portion and secured thereto by plural screw fasteners 26.

Centrally of that face of the body element 18 remote to the tubular extension 20 there is provided a circular tapered seat 28 defining the entery to a circular axial passage 30 extending through the cylindrical body into and communicating with the bore of the tubular extension 20. Intermediate the tubular extension 20 and the axial passage 30 there is provided a restricted throat region 32 which is defined by a tapered conical seat 33 and within which resilient sealing rings 34, generally of the O-ring type, are circumferentially fixed. Adjacent the tubular extension the throat tapers outwardly to define an angular shoulder or seat 35 disposed toward the central bore of the tubular extension 20.

Figure 6:
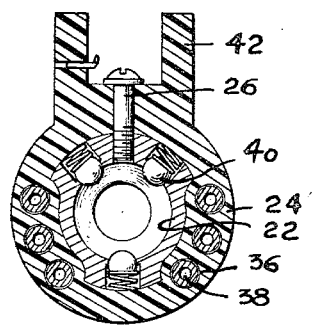
Figure 7:
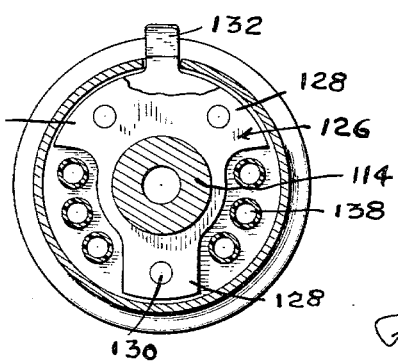
FIG. 7 is a vertical section taken on line 7—7, FIG. 4b.

Additionally, as best seen in FIG. 6, the body element 18 is provided with plural, radially spaced spring seated detent balls 40 mounted in the central portion 22 thereof to have restricted portions thereof projecting into the axial passage 30 in typical fashion. The outer ring portion 24 of the body element 18 is provided with a pair of integrally formed spaced hinge ears 42 which project perpendicularly therefrom and which receive a hinge pin 44 mounting a circular cap member 46 which is provided centrally of the underside thereof with a circular depending boss 48. A coil spring 50 mounted about the hinge pin 44 intermediate the ears 42 is provided with an extended leaf element 52 bearing against the upper face of the lid member 46 urging it about the pin 44 toward a position normally closing the axial passage 30 as illustrated in dotted line in FIG. 4a of the drawings.

Associated with the extended end of the tubular extension 20 of the female coupling body element is a tube or hose engaging stem 56 which consists of an elongated, rigid tubular conduit 58 having an enlarged circular base flange 60 with which is integrally formed on the face thereof opposite stem 56 an externally threaded tubular extension 62 in which a central, axial socket 64 defines a shoulder 66 annularly about the point of communication between said socket and the central bore 68 of the tubular conduit. The extended end of the stem 56 is provided with an annular, raised bead 70 thereabout, and the base end of the stem 56 adjacent flange 60 is provided with an enlarged boss 72 which is externally threaded as at 74.

As is best seen in FIG. 4a of the drawings, the externally threaded extension 62 of the tube engaging stem 56 is inserted and threadedly engaged within the extended end of the tubular extension 20 and an elongated coil spring 76, positioned axially within the tubular extension, seats on the shoulder 66 in stem socket 64 and biases a check valve element 78, having a sealing ring 79, longitudinally of the extension toward and against the angular shoulder or seat 35 adjacent the restricted throat area 32 of the body element 18.

A cylindrical casing sleeve 80 is positioned concentrically about the tubular extension 20 and is engaged in and retained between annularly notched grooves 82 and 84 formed in longitudinal opposition on the outer circumferential ring element 24 of the body element and on the enlarged flange 60 of the tube engaging stem element 56 respectively. The tubular casing 80 encloses the extension 20 and the terminal projections of the pin sockets 38 between the flange 60 and the body element 18.

The hose section 14 with which the female coupling component is associated conventionally consists of a corrugated, smooth bore flexible tube, shown in dotted line at 86, into which the stem 56 is slidably engaged. A metallic sleeve or ferrule 88 is positioned concentrically about that free end of the tube 86 in which the stem is inserted and the ferrule is threadedly secured on the threaded shoulder 72 of the stem to extend substantially co-extensively therewith, and then the ferrule is swaged upon that portion of the tube wall between the ferrule and the stem 56. Electrical leads 89 built into the wall of the corrugated tube 86 are extracted through the side wall of the tube in conventional manner and are extended linearly through drilled passages 90 in the enlarged flange 60 of the stem 56 to extend into that area about tubular extension 20 within casing 80. The leads are helically wound around tube 20 and are connected with the terminal ends of the conductive pin sockets 38. A drilled opening 92 provided in the casing 80 permits the introduction of potting compound into the area surrounding tubular extension 20 after the leads are electrically connected into the terminal ends of the pin sockets and the female component is assembled.

To complete the assembly of the female coupling component with the flexible tube 86, that end of the tube adjacent the sleeve ferrule 88 is provided with a molded end, illustrated in dotted line at 94, which molded end extends from a point beyond the extended end of stem 56 over ferrule 88 to a flush position with the enlarged flange 60, thereby finishing the assembly and at the same time encasing within the molded end the electrical leads extending from the flexible tubing 86 through the drilled openings in enlarged flange 60.

Figure 4B:
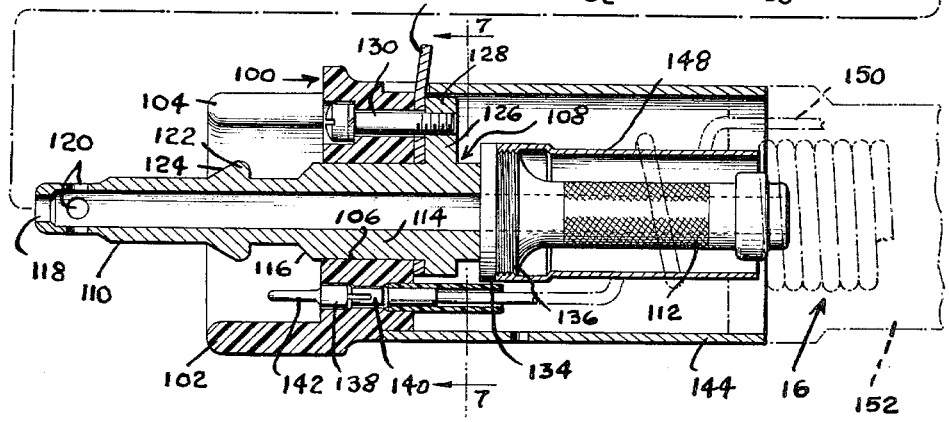
FIG. 4b is a sectional view taken on line 4b—4b, FIG. 3.
Figure 3:
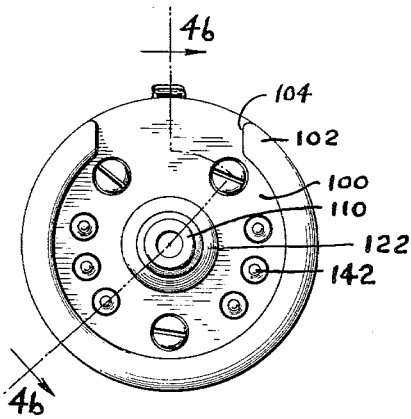
FIG. 3 is an end view of the male coupling component.
Figure 5:
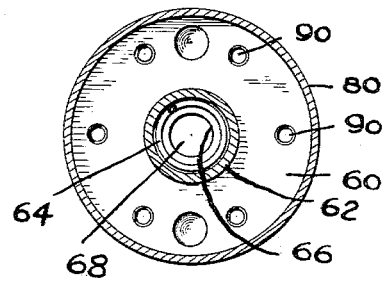

The male coupling component of the combination coupling constituting the present invention is best illustrated in FIGS. 3 and 4b of the accompanying drawings. This male component consists of a cylindrical body section of non-conductive material generally indicated at 100 which is provided about one face thereof with an extended marginal flange 102 which is interrupted at 104 through a portion thereof. The cylindrical body element has a central axial passage or bore 106 extending therethrough.

Associated with the body element 100 is a conduit assembly, generally designated at 108, which consists of an elongated tubular stem 110 adapted for connection with the female coupling component, and an oppositely extending tubular stem 112, similar to stem 56 hereinbefore described, which is adapted for insertion within the smooth bore of the flexible oxygen hose section generally designated at 16. The coupling stem 110 consists of a cylindrical base portion 114 engaged within the axial passage or bore 106 of the body element presenting in projection outwardly within and beyond the marginal flange 102 a thin tube defined by an inclined shoulder 116 adjacent the face of the body element. The stem tube has an open extended end 118 and axially disposed openings 120 in the wall thereof adjacent the open end. Intermediate the length of the stem portion 110 a raised rib element 122 is formed annularly about the stem with an inclined wall 124 disposed toward the projected open end thereof.

Adjacent that face of the body element 100 remote to the projecting stem portion 110 the stem assembly 103 includes, integrally with the base portion 114, a trifurcated plate or flange 126 the projecting arms 128 thereof being secured to the adjacent face of the body element by means of screw fasteners 130 entering from the opposed face of the body element and engaging therein. One of said screw fastening elements 130 further secures a flat metallic tab 132 between the body element and one of the trifurcated arms 128 to project outwardly substantially perpendicularly to the axial centerline of the component for purposes to be hereinafter described.

Spaced from the trifurcated flange 126 the stem assembly is provided with a circular flange 134 having a threaded boss 136 adjacent thereto and defining the base end of the tubular hose engaging extension or stem 112 projecting therefrom.

The body element 100 is provided with passages 138 therethrough in radially spaced positions about the stem assembly 103 coinciding in their positions so as to register with the pin socket passages 36 in the female coupling as will be described. Each passage 138 receives and retains the base of a conductive pin 140 therein which supports in projection outwardly therefrom within the confines of body element flange 102 the conductive pin element 142 adapted to engage in a pin socket in the female component. The terminal ends of the conductive pins project outwardly from the opposed face of the body element within the trifurcations defined by the trifurcated flange 126 on that face of the body element.

A cylindrical sleeve casing 144, similar to the casing 80 previously described relative to the female component, is positioned concentrically about the extended tube engaging stem projection 112 and engages against a notched shoulder formation 146 about the adjacent face of the body element 100 to project substantially in co-extension with the tube engaging stem element 112.

A sleeve or ferrule 148 concentrically surrounds tube engaging stem 112 within the confines of the casing 144 and is threadedly connected to the threaded boss 136 at the base end of the tube engaging stem.

The male coupling component is positioned relative to the flexible tube section 16 to which it is attached with the tube engaging stem 112 inserted within the bore of the flexible wall of the tube and with the ferrule or sleeve 148 concentrically about the tube wall upon which it is swaged. The electric leads 150 from the flexible tube extend into the casing 144 to connect to the terminal ends of the conductive pins and a molded end, illustrated in dotted line at 152, about the end of the flexible wall hose abuts the projected end of casing 144 finishing off the assembly.

In the cooperative function of the male and female components the lid 46 of the female component is moved away from its passage closing condition to that shown in full line in FIG. 4a, whereupon the projected stem 110 of the male component is inserted within the axial passage 30 of the female body element and is slidably moved inwardly to a point to where the extended end of the stem will depress the check valve element 78 against the bias of spring 76 to open communication between the hollow stem 110 and the hollow bore of the tubular extension 20 of the female component. When the stem is fully inserted the sealing rings 34 will securely engage and seal the forward portion of the stem while the inclined edge of rib 122 will move past the spring pressed balls to engage against the inclined wall 33 defining entry to the throat portion 32, positioning the rib 112 inside the spring pressed balls and bringing the inclined wall portion 116 of the stem into engagement with the conical seat 28 at the entry to passage 30. At the same time, the conductive pins 142 will be inserted into the conductive pin sockets 38 in the female component, as illustrated in FIG. 8, with which they register, thereby locking the male and female component elements in gas and electric conducting engagement. The spring bias of lid 46 will cause it to move to the position shown in FIG. 1 wherein the boss element 48 on the underside thereof will engage behind tab 132 on the male element preventing axial separation of the male and female components, while at the same time the marginal flange 102 on the male component will serve to enclose and shield the electrical connection between the pins and the sockets of the two components.

The detailed structures of the pin and socket elements which are commercially available from The Deutsch Company of Banning, California, are shown in FIG. 8. Both pins and sockets are secured within the passages of the coupling components by use of split tubes 160 which are positioned within restricted portions of the passages in each element and which receive therein tapered portions of the pins or sockets, as the case may be, to resiliently retain the same in a fixed axial position within the passages. An extractor and insertion tool is available for these pins and sockets. The lead wires to the pins and sockets respectively are brought within a Teflon or like insulating extension 162 on the base ends of the pins and the sockets and are inserted within a receptacle formation in the base of each pin and each socket wherein they are soldered, as at 164, to form a terminal connection.

In FIGS. 10 through 13 of the accompanying drawings there is illustrated a novel concept for mounting the female coupling component of the present combination in a fixed position within a vehicle console to permit the ready connection and disconnection of a male coupling secured to a length of tubing connected to personnel gear into and out of gas and electric communication with sources connected in turn to the female element in the console mount. The console mount consists of a console plate 170 secured at multiple points 172 thereon to a fixed element of an aircraft or like vehicle. Said console plate is provided, in the present instance, with two circular openings 174, each of which is adapted to receive the upper end portion, vertically therethrough, of a tubular sleeve 176 which is provided with a triangular plate 178 secured about an intermediate portion thereof by welding or the like and which plate is provided in triangular arrangement thereon with vertical openings 180 therethrough. The triangular plate 178 is secured by combination screw fastener elements 182 against the underside of console plate 170 and the female component of the coupling is slidably inserted downwardly through the sleeve 176 projecting above the console plate to position the receptacle end of the female component above the console plate in ready position for opening and reception of a male component element in the manner herein before described.

As is shown in dotted line in FIGS. 4a and 4b, it is fully contemplated and intended that the electrical leads extending from the flexible hose units to the disconnect pins or the pin sockets be provided with substantial helically wound slack within the confines of the casings 80 and 144 of the female and male components respectively, whereby the head elements of the two components may be quickly and readily disassembled through the medium of the screw fasteners retaining the component elements of the head portions together and permit ready access to the terminal ends of the pins and the pin sockets for repair or replacement. Upon reassembly of the units an electrical potting compound may be readily introduced under pressure into the casings of the male and female components. Thus, reconstruction or repair of the pins and sockets may be accomplished without disturbing or impairing in any manner the molded, integrally formed gas tight connection between the components and their respective hose or tube sections.

Having thus described and explained the construction and function of my invention in respect to the combination and sub-combination of elements thereof, what I desire to claim is:

1. In combination with two separate sections of flexible hose each having a gas conduit axially therethrough and plural electric leads extending longitudinally within the walls thereof and projecting from the remote ends thereof, a gas-electric coupling composed of a female and a male conponent; said female component comprising a body member having an axial passage therethrough communicating with a tubular extension projecting axially from one face thereof, plural conductive pin sockets secured in insulated condition in said body member concentrically about the axial passage therein and opening outwardly through that face of said body member remote to the tubular extension thereon, said pin sockets having terminal ends projecting from said body member concentrically about the tubular extension thereon, a tubular hose insert stem removably secured to said body member extension and secured in the gas conduit in the adjacent end of one section of said flexible hose, the electric leads projecting from said adjacent hose end being secured to the terminal ends of said conductive sockets, and a tubular casing projecting from the body member to said hose removably enclosing the electric leads and terminal ends of said pin sockets; said male component comprising, a body element having a tubular stem extending therethrough and projecting from one face thereof, a tubular hose insert extension projecting axially from that face of the body element remote to the projecting stem and secured in the gas conduit in the adjacent end of the second hose section, plural conductive pins secured in insulated condition in said body element concentrically about and projecting in parallel with said stem, said conductive pins having terminal ends projecting from said body element concentrically about said tubular hose insert extension, the electric leads projecting from said adjacent hose end being secured to the terminal ends of said pins, and a tubular casing removably secured between said body element and said hose section enclosing the electric leads and the terminal ends of said pins.

2. A combination as defined in claim 1 wherein the pin sockets are slidably resiliently secured in the female body member from the terminal end face thereof, and wherein the conductive pins are slidably resiliently secured in the male body element from the terminal end face thereof.

3. A combination as defined in claim 1 wherein the tubular stem of the female body member is provided with an enlarged flange adjacent its attachment to said tubular extension, and said tubular casing is rigidly engaged between said stem flange and said body member.

4. A combination as defined in claim 1 wherein said female body member is provided with a spring hinged lid having a centrally depending projection on the underside thereof normally seating within the axial passage of said body.

5. A combination as defined in claim 1 wherein said female body member is provided with a spring hinged lid having a centrally depending projection on the underside thereof normally seating within the axial passage of said body, and said male body element supports a projecting tab engageable with the lid projection of the female body member when said male body element and female body member are engaged.

6. A combination as defined in claim 1 wherein the male body element is formed of a non-conductive material, and wherein the female body member is composed of two concentric units the outermost of which is non-conductive and supports the pin sockets therein.

References Cited by the Examiner
UNITED STATES PATENTS

| | | | |
|---|---|---|---|
| 894,644 | 7/08 | Hill | 339—44 X |
| 1,552,521 | 9/25 | Van Dorn et al. | 339—16 X |
| 2,411,861 | 12/46 | Antony et al. | 339—217 |
| 2,593,182 | 4/52 | Quackenbush | 339—44 |
| 2,631,185 | 3/53 | Earle et al. | 339—16 |
| 2,859,422 | 11/58 | Oliveau | 339—217 X |
| 3,028,574 | 4/62 | Di Monte | 339—217 X |
| 3,110,537 | 11/63 | Poetzsch et al. | 339—16 |

FOREIGN PATENTS 25,377   5/12   Great Britain.

JOSEPH D. SEERS, *Primary Examiner.*
THOMAS J. HICKEY, *Examiner.*